(12) United States Patent
Gong et al.

(10) Patent No.: US 9,889,989 B2
(45) Date of Patent: Feb. 13, 2018

(54) STORAGE AND DISTRIBUTION DEVICE AND METHOD

(75) Inventors: Zhonglin Gong, Danyang (CN); Zhiqiang Chen, Danyang (CN)

(73) Assignee: JIANGSU XUNJIE SCIENCE AND TECHNOLOGY LIMITED COMPANY OF EQUIPMENT AND TOOLS, Danyang, Jiangsu (CN)

( * ) Notice: Subject to any disclaimer, the term of this patent is extended or adjusted under 35 U.S.C. 154(b) by 378 days.

(21) Appl. No.: 14/352,403

(22) PCT Filed: Apr. 20, 2012

(86) PCT No.: PCT/CN2012/074447
§ 371 (c)(1),
(2), (4) Date: Apr. 17, 2014

(87) PCT Pub. No.: WO2013/134989
PCT Pub. Date: Sep. 19, 2013

(65) Prior Publication Data
US 2014/0255132 A1    Sep. 11, 2014

(30) Foreign Application Priority Data
Mar. 15, 2012 (CN) .......................... 2012 1 0067849

(51) Int. Cl.
*B65H 1/00* (2006.01)
*G07F 11/10* (2006.01)
(Continued)

(52) U.S. Cl.
CPC ........... *B65G 1/137* (2013.01); *B65G 1/0435* (2013.01); *B65G 1/1376* (2013.01); *G07F 11/62* (2013.01)

(58) Field of Classification Search
CPC .... B65G 1/137; B65G 1/0435; B65G 1/1376; G06Q 10/087; G07F 11/62
(Continued)

(56) References Cited

U.S. PATENT DOCUMENTS 3,520,104 A * 7/1970 Gillespie ................. B65B 5/024
53/131.4
4,531,345 A * 7/1985 Nigrelli ................... B65B 21/16
53/247
(Continued)

FOREIGN PATENT DOCUMENTS

| CN | 2680263 | 2/2005 |
|----|---------|--------|
| CN | 1789092 | 6/2006 |

(Continued)

OTHER PUBLICATIONS

International Search Report and Written Opinion in PCT/CN2012/074447.

*Primary Examiner* — Rakesh Kumar
(74) *Attorney, Agent, or Firm* — Leason Ellis LLP (57) ABSTRACT

A storage and distribution device and method based on an arrangement whereby the largest sides of boxed products are in contact with one another are disclosed. The device includes a storage device, a blind door and a restocking manipulator. The blind door is disposed at the front of the storage device, and the restocking manipulator is disposed at the rear of the storage device. The storage device includes a plurality of storage units. Each of the storage units includes a matrix storage rack provided with a plurality of storage passages in a matrix arrangement. Each of the storage passages includes two baffle plates having brushes and a bottom plate. A discharge control device is disposed at the front of a discharge end of each storage passage. A spiral spring driver is further disposed on each storage passage. The driver is driven by a spiral spring energy-storage device
(Continued)

to move stored items towards the discharge end of the passage. The restocking manipulator automatically restocks according to instructions from a computer. The system of the present invention is highly automatic, and has large storage capacity and short feeding time, thereby substantially increasing space utilization rate and operating efficiency.

13 Claims, 6 Drawing Sheets (51) Int. Cl.
B65G 1/137 (2006.01)
B65G 1/04 (2006.01)
G07F 11/62 (2006.01)

(58) Field of Classification Search
USPC .......................................... 221/133
See application file for complete search history.

(56) References Cited

U.S. PATENT DOCUMENTS

| | | | | |
|---|---|---|---|---|
| 6,684,126 B2* | 1/2004 | Omura | ............... | G07F 11/04 221/2 |
| 6,962,267 B2* | 11/2005 | Herzog | ............... | B65G 1/06 221/130 |
| 7,434,704 B2* | 10/2008 | Yuyama | ............... | G07F 11/16 221/221 |
| 8,038,016 B2* | 10/2011 | Yuyama | ............... | G07F 11/22 211/175 |
| 8,047,385 B2* | 11/2011 | Hardy | ............... | A47F 1/12 211/59.3 |
| 8,146,753 B2* | 4/2012 | Yuyama | ............... | A61G 12/001 211/59.3 |
| 2004/0193316 A1* | 9/2004 | Lunak | ............... | B65G 1/12 700/243 |
| 2005/0189364 A1* | 9/2005 | Herzog | ............... | B65G 1/06 221/1 |
| 2005/0189369 A1* | 9/2005 | Vlastakis | ............... | A47F 1/126 221/123 |
| 2010/0294791 A1* | 11/2010 | Weibel | ............... | B65D 83/0005 221/1 |
| 2014/0255132 A1* | 9/2014 | Gong | ............... | B65G 1/0435 414/273 |
| 2014/0305962 A1* | 10/2014 | Tschan | ............... | G07F 11/045 221/221 |
| 2015/0320236 A1* | 11/2015 | Paradise | ............... | A47F 1/065 221/221 |

FOREIGN PATENT DOCUMENTS

| | | | | |
|---|---|---|---|---|
| CN | 201686257 | | 12/2010 | |
| CN | 102001505 | | 4/2011 | |
| CN | 102241315 | | 11/2011 | |
| CN | 202414606 U | | 9/2012 | |
| CN | 202529474 | | 11/2012 | |
| EP | 0683116 A1 | * | 11/1995 | ............ B65G 1/08 |
| EP | 0683116 A1 | * | 11/1995 | ............ B65G 1/08 |
| JP | 2003300608 | | 10/2003 | |
| JP | 2005212953 | | 8/2005 | |
| KR | 101182088 B1 | * | 9/2012 | ............ G07F 11/165 |
| WO | WO 2009001383 A1 | * | 12/2008 | ............ G07F 11/007 |

* cited by examiner

STORAGE AND DISTRIBUTION DEVICE AND METHOD

FIELD OF THE INVENTION

The present invention relates to the technical field of logistics and inventory, and more particularly to an automatic storage and distribution device and method based on an arrangement whereby the largest sides of boxed products are in contact with one another.

DESCRIPTION OF THE RELATED ART

Currently, the conventional equipment for storage, restocking, discharge, and automatic distribution of products are accomplished by non-powered slope storage passages, which has a simple structure but has the deficiencies that the slope s produce a large dip angle, the space utilization is low, the storage capacity is low and the restocking speed is slow, which cannot meet the requirement for the restocking and discharge of large amounts of products. Particularly, since in the method of the slope storage and the non-powered pushing, the discharge is accomplished totally based on the weight of the products, when the weight of the products cannot overcome the friction force, the storage stalls at the storage passages and will not slide down, which greatly influences the normal discharge effect and greatly reduces the technical performances of the equipment and system.

The PRC Patent entitled "a drawer-type boxed products storage and distribution device" disclosed a device, in which a heavy object is disposed at the rear of product boxes, the storage passages have an angle from the ground, the heavy object disposed at the rear of product boxes slides towards the discharge port under the function of the gravity, and finally the boxed products are pushed out of the storage passages. However, the device still functions based on the weight of the heavy object and the storage passages have an angle from the ground, the storage space needs improvement.

A conveyor belt propelled by motor currently available on the market is used for realizing the storage restocking and discharge. Although the deficiency of the non-powered slope storage passages is overcome, for the device that needs hundreds or even thousands of storage positions, the method of using the conveyor belt propelled by motor to push the products causes the complicated mechanical structure and control method, and moreover increases the cost and the chances of failure, consumes energy, and is not advantageous for equipment maintenance and environmental protection.

The PRC Patent entitled "a drawer-type boxed products storage and distribution device with an automatic pushing function" solves the storage namely space utilization problem, but compared with the intelligence and smart management of boxed products, there are heaps of problems in need of solutions, e.g. the automatic stocks checking of the products, manipulation of small batch restocking, and particularly, the storage drawers need to be taken out When need to restock, so the discharge of products cannot be carried out at the same time of restocking.

SUMMARY OF THE INVENTION

An objective of the present invention is to provide an automatic storage and distribution device and method based on an arrangement whereby the largest sides of boxed products are in contact with one another.

To achieve the objective of the present invention, a storage and distribution device based on an arrangement whereby the largest sides of boxed products are in contact with one another is provided, which includes a storage device, a blind door and a restocking manipulator. The blind door is disposed at the front of the storage device, and the restocking manipulator is disposed at the rear of the storage device. The storage device includes a plurality of storage units. Each of the storage units includes a matrix storage rack provided with a plurality of storage passages in matrix arrangement. Each storage passage includes two baffle plates having the anti-reverse brushes and a bottom plate. A discharge control device is disposed at the front of a discharge end of each storage passage fixedly connected with the storage rack. A spiral spring driver is further disposed on each storage passage. The boxed products are placed between the spiral spring driver and the discharge controller. The spiral spring driver is driven by the corresponding spiral spring energy-storage device to move towards the discharge end of the storage passage, and the restocking manipulator automatically restocks and checks the stocks of the storage device according to instructions from a computer.

A storage and distribution method based on the above-mentioned storage and distribution device based on an arrangement whereby the largest sides of boxed products are in contact with one another includes the following steps.

In Step 1, the storage and distribution device is assembled, which includes assembling and inserting the baffle plates having the boxed products anti-reverse brushes on the bottom plates of the storage passages of the storage rack of each storage unit according to the length or width of the dimension of the boxed products, i.e. the longest edge or the second longest edge of the contour dimension. If the height between the bottom plates of the storage passages is set and assembled according to the width of the dimension of the boxed products i.e. the second longest edge, the width between the baffle plates having the boxed products anti-reverse brushes is set and assembled according to the length of the dimension of the boxed products i.e. the longest edge, thus forming N independent storage passages. If the height between the bottom plates of the storage passages is set and assembled according to the length of the dimension of the boxed products i.e. the longest edge, the width between the baffle plates having the boxed products anti-reverse brushes is set according to the width of the dimension of the boxed products i.e. the second longest edge, thus forming N independent storage passages. The storage unit is assembled and finally the storage device is formed.

In Step 2, a discharge control device is disposed at the front end of each storage passage of the storage device, a spiral spring driver is disposed on each storage passage, and a spiral spring energy-storage device and a driver-retracting roller device 19 are disposed correspondingly.

In Step 3, a products receiving and delivering conveyor belt is disposed under the discharge port, a blind door is disposed at the front of the discharge port, a restocking manipulator is disposed at the rear of the storage device, and the assembling operation is completed.

In Step 4, the products are restocked, in which the manipulator moves from the restocking platform to the restocking port of the storage passages, the manipulator locks up the driver-retracting roller device and propels the spinning of the winder, and finally under the traction of the winding wire, the spiral spring driver is pulled out and fixed. Then, the boxed products arranged according to the largest sides on the restocking platform are sequentially pushed by the manipulator into the storage passages, the spiral spring driver is released, the manipulator returns to the restocking platform, and than step 4 is repeated until the restocking of all the storage passages is completed.

In Step 5, it is determined if the discharge instructions exist, if yes, the thrust device of the discharge control device urges the outmost product at the discharge port of the storage passage to a height over the highest point of the discharge port barrier, so that the spiral spring driver is driven by the spiral spring driving device to move towards the discharge port, and the urged product is pushed out of the discharge port, thus achieving the discharge purpose, and now, the counting device counts the discharged product boxes. The discharged product boxes fall on the discharged-products conveyor belt and are delivered out. If no discharge instructions exist, no operations are carried out.

Step 6, it is determined if the restocking operation needs to be carried out, if yes, the Step 4 is executed, and if no, no operations are carried out.

Compared with the prior arts, the present invention has the following significant advantages. 1) The technique of the storage and distribution based on an arrangement whereby the largest sides of boxed products are in contact with one another of the present invention employs the passage storage with the boxed products anti-reverse brushes for storing, since each storage passage is provided with the anti-reverse brushes, the boxed products will not trip forward or backward in the storage passages and the devices like anti-reverse blocks are not required, and compared with the conventional technique of the anti-tripping blocks, the present invention makes use of the storage space and avoids the troubles of recycling the blocks. 2) When it needs to restock by using the manipulator, since there are stocks of the products in storage passages for distribution, the manipulator does not come out of the storage passages during the restocking, only the pushing trolley is pulled out for restocking, so that the restocking and the distribution can be carried out at the same time. 3) The present invention is widely applicable to the logistics, storage, and distribution of boxed products in the pharmacy, medical, tobacco, mechanical, chemical, food industries, and particularly applicable to the storage and distribution of box-packed medicines. 4) The device of the present invention has a simple structure, is easy and cheap to maintain, is highly intelligent, and facilitates the large-scale manufacturing.

The details of the present invention will be described as follows with reference to the drawings.

DETAILED DESCRIPTION OF A PREFERRED EMBODIMENT

Figure 1:
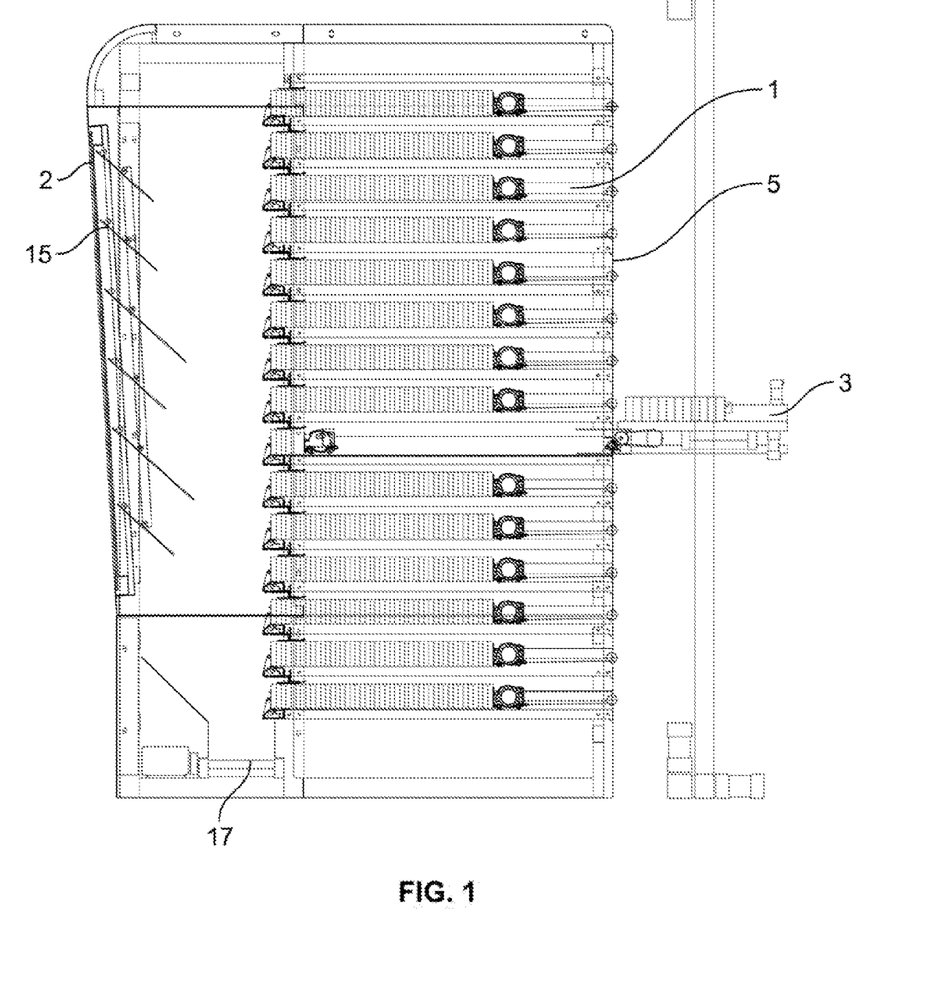
FIG. 1 is an overall schematic structural view illustrating an automatic storage and distribution device based on an arrangement whereby the largest sides of boxed products are in contact with one another of the present invention.
Figure 2:
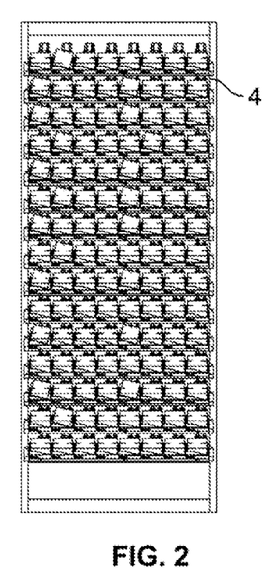
FIG. 2 is a schematic structural view illustrating a storage unit in the automatic storage and distribution device based on an arrangement whereby the largest sides of boxed products are in contact with one another of the present invention.
Figure 3:
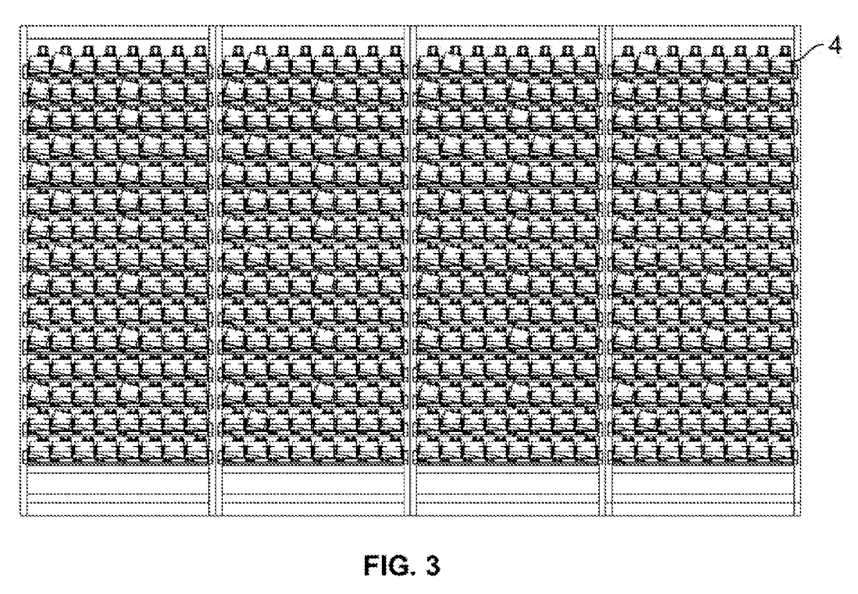
FIG. 3 is a schematic assembly view illustrating the storage unit in the automatic storage and distribution device based on an arrangement whereby the largest sides of boxed products are in contact with one another of the present invention.

Referring to FIGS. 1, 2 and 3, a storage and distribution device based on an arrangement whereby the largest sides of boxed products are in contact with one another of the present invention includes a storage device 1, a blind door 2 and a restocking manipulator 3. The blind door 2 is disposed at the front of the storage device 1, and the restocking manipulator 3 is disposed at the rear of the storage device 1. The storage device includes a plurality of storage units 4. Each storage unit includes a matrix storage rack 5 provided with a plurality of storage passages in matrix arrangement. Each storage passage includes two baffle plates 6 having the anti-reverse brushes 18 and a bottom plate 7. A discharge control device 8 is disposed at the front of a discharge end of each storage passage fixedly connected to the storage rack. A spiral spring driver 10 is further disposed on each storage passage, boxed products 9 are placed between the spiral spring driver and the discharge controller, the spiral spring driver is driven by a corresponding spiral spring energy-storage device 11 to move towards the discharge end of the storage passage, and the restocking manipulator 3 automatically restocks and checks the stocks of the storage device 1 according to instructions from a computer. The storage unit 4 may be combined as required, and as the structures of all the storage units are identical to one another, the combination is quite convenient. The spiral spring driver 10 when moves tightly urges the product boxes 9 at the front of the spiral spring driver 10, and the discharge operation of the product boxes is accomplished under the control of the discharge control device.

The manipulator is disposed at the rear of the storage device 1 and can implement the real-time restocking operation. In implementing restocking, the manipulator pulls out the spiral spring driver backwards, reloads the boxed products in the storage passage, the reloaded boxed products are still in contact with one anther with the largest sides, and the boxed products are arranged with the largest sides in the direction towards the discharge port and are pushed to the storage passages by the manipulator. Then, the manipulator places the spiral spring driver 10 in the storage passages, and now the restocking operation is completed.

The bottom plate 7 and the baffle plates 6 of the storage passages are detachable from each other, a plurality of slots for inserting the baffle plates 6 of the storage passages are arranged in the bottom plate at each level of the matrix storage rack, the slots extend in a direction that is the same as that of the storage passages, and the bottom plate of the storage rack is partitioned by the baffle plates into the plurality of storage passages.

Since a plurality of slots for inserting the baffle plates of the storage passages are arranged in the bottom plate of the storage passages, the width of the storage passages can be customized according to the longest edge or the second longest edge of the dimension of the boxed products, so as to be combined into the storage passages which applicable to the storage and distribution of the boxed products having different specifications.

Figure 4:
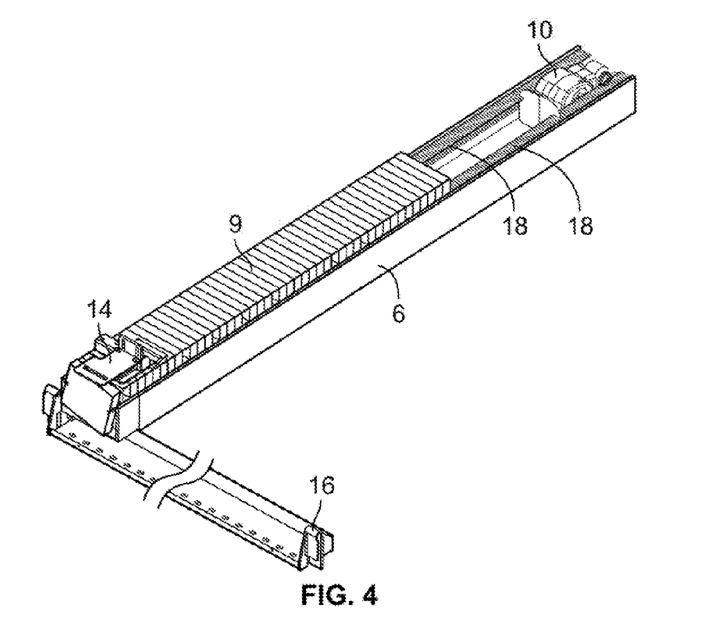
FIG. 4 is a schematic view illustrating storage passages of the automatic storage and distribution device based on an arrangement whereby the largest sides of boxed products are in contact with one another of the present invention.
Figure 5:
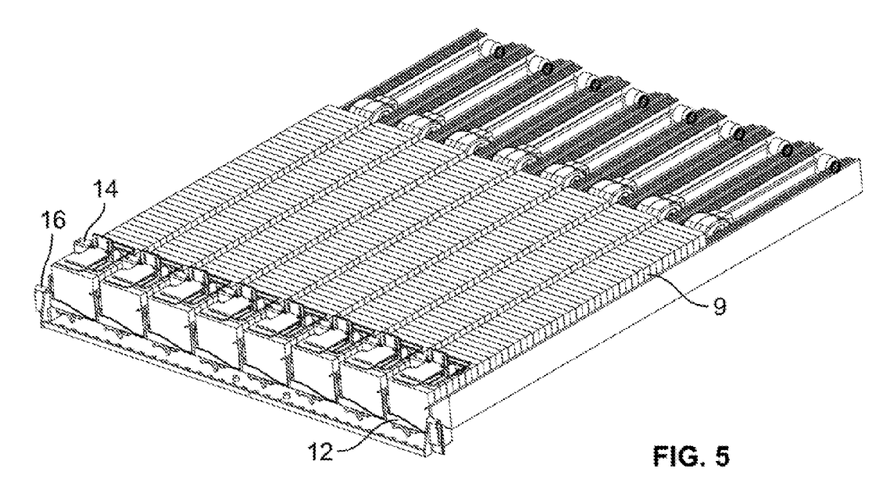
FIG. 5 is a schematic view illustrating the storage passages on one level of the storage rack in the automatic storage and distribution device based on an arrangement whereby the largest sides of boxed products are in contact with one another of the present invention.

Referring to FIGS. 4 and 5, the two baffle plates i.e. the left and right baffle plates of each storage passage have anti-reverse brushes 18 in the extending direction, and the brushes are disposed on an inner side of the baffle plates 6 of the storage passage and extend towards a central axis of the storage passage. The brushes along the length direction of the storage passages are allowed to be arranged with an interval as long as the brushes can stop the backward tripping of the product boxes. The brushes are made of animal bristles or chemical materials like plastics, and may also be made of fine steel wire.

The spiral spring energy-storage device 11 is disposed on the spiral spring driver 10, and the energy-storage device includes a spiral spring and a traction wire winder. A spiral spring is disposed in a cavity of the traction wire and is driven by a torque to propel the spinning of the winder, a traction wire is wound on the winder, and the other end of the traction wire is fixed to the discharge control device 8.

The spiral spring energy-storage device 11 may also be disposed at the rear of the discharge control device 8 and under the discharge port of the storage passage. The energy-storage device 11 includes a spiral spring and a traction wire winder. The spiral spring is disposed in a cavity of the traction wire and is driven by a torque to propel the spinning of the winder, a traction wire is wound on the winder, and the other end of the traction wire is connected to the spiral spring driver 10.

A driver-retracting roller device 19 is disposed at the restocking port of each storage passage and the roller device includes a driver-retracting traction wire winder. A traction wire is wound on the winder, and the other end of the traction wire is fixed to the spiral spring driver 10. The winder can be propelled by the manipulator to rotate, so as to tighten the traction wire and finally pull the spiral spring driver 10 back to the restocking port.

A discharged-products counting device 16 is disposed on the left and right positions at the front of the discharge port of the storage passage in each storage unit 4, for counting the number of the discharged products.

Figure 6:
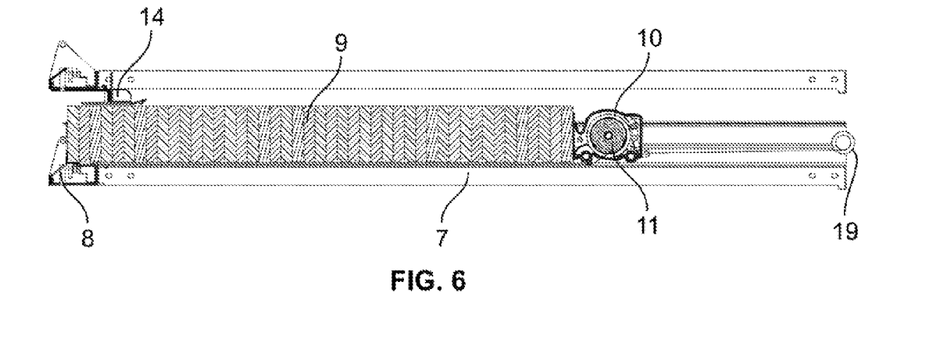
FIG. 6 is a side view illustrating the storage passages.
Figure 7:
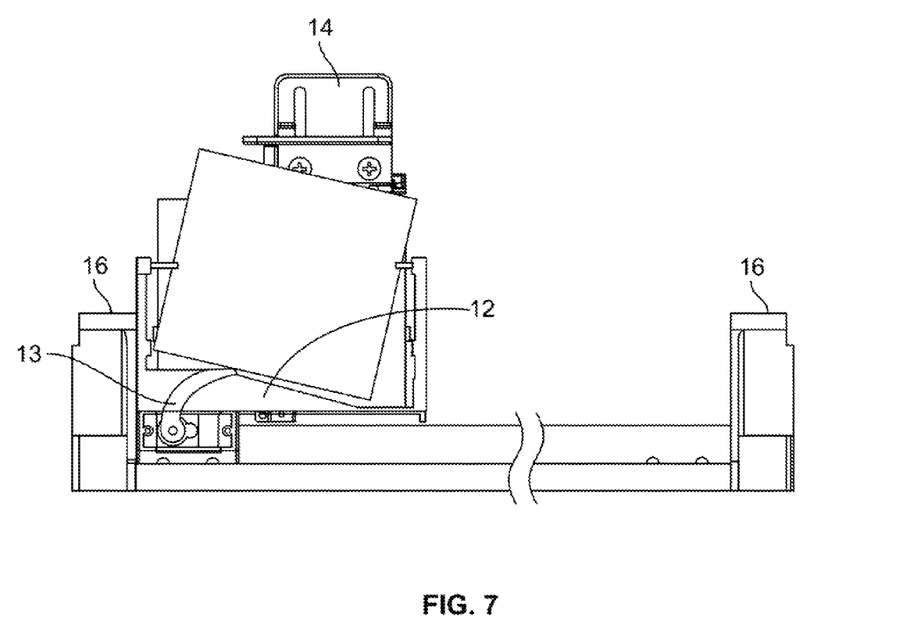
FIG. 7 is a schematic view illustrating a discharge control device.

Referring to FIGS. 6 and 7, the discharge control device 8 includes a front barrier 12, a thrust device 13 and a second box-anti-lifting device 14. The front barrier 12 is disposed at the far front end of the discharge port of the storage passage, and the thrust device 13 is disposed at the bottom of the front end of the storage passages. The thrust device 13 when urges is located at the rear of the front barrier 12 and the second box-anti-lifting device 14 is located above the front end of the storage passages.

The thrust device 13 in the discharge control device 8 is a cam or a hard piece. One end of the hard piece is fixed to the output shaft of a motor in the discharge control device and is able to rotate by 360° when propelled by the motor. A circular plane where the hard piece rotates is parallel to the largest sides of the boxed products that are urged up, and the hard piece is in contact with the bottom of the boxed products. The rotation angle of the rotary hard piece may be adjusted as required, and generally between 0~360° as long as it can urge up the product boxes.

Figure 8:
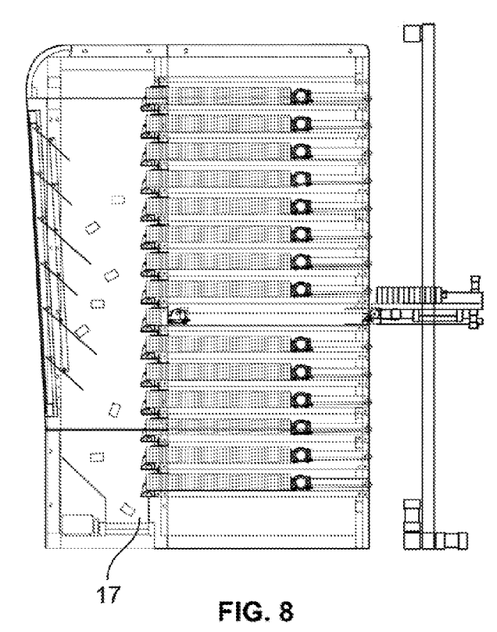
FIG. 8 is a schematic view illustrating a using status of the automatic storage and distribution device based on an arrangement whereby the largest sides of boxed products are in contact with one another of the present invention.

Referring to FIG. 8, the storage passages have an angle from the horizontal plane, the discharge end of the storage passage is lower than the other end of storage passages, and an included angle formed between the storage passages and the horizontal plane is less than or equal to 9°, which greatly improves the space utilization.

Slats 15 of the blind door have a width larger than or equal to 100 mm, and the slats 15 of the blind door are able to turn over. When the slats 15 and the horizontal plane are in the same plane, the discharge status can be observed. When the slats 15 of the blind door are vertical to the horizontal plane, the blind door provides the shade function and renders a chic appearance.

A buffer curtain is disposed between the blind door 2 and the storage device 1, and a discharged-products conveyor belt 17 is arranged at the bottom of the storage device 1. The discharged products go through the buffer action of the buffer curtain and fall on the conveyor belt 17 at the bottom of the discharge port, and are delivered to the designated location.

Figure 9:
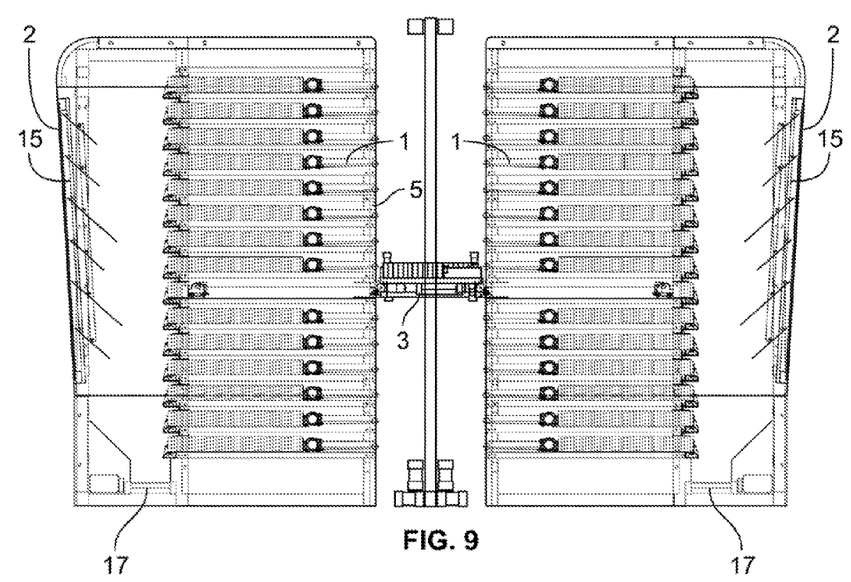
FIG. 9 is a schematic structural view illustrating the storage devices disposed on the left and right sides and the restocking manipulator disposed in the middle of the storage devices in the automatic storage and distribution device based on an arrangement whereby the largest sides of boxed products are in contact with one another of the present invention.
Figure 10:
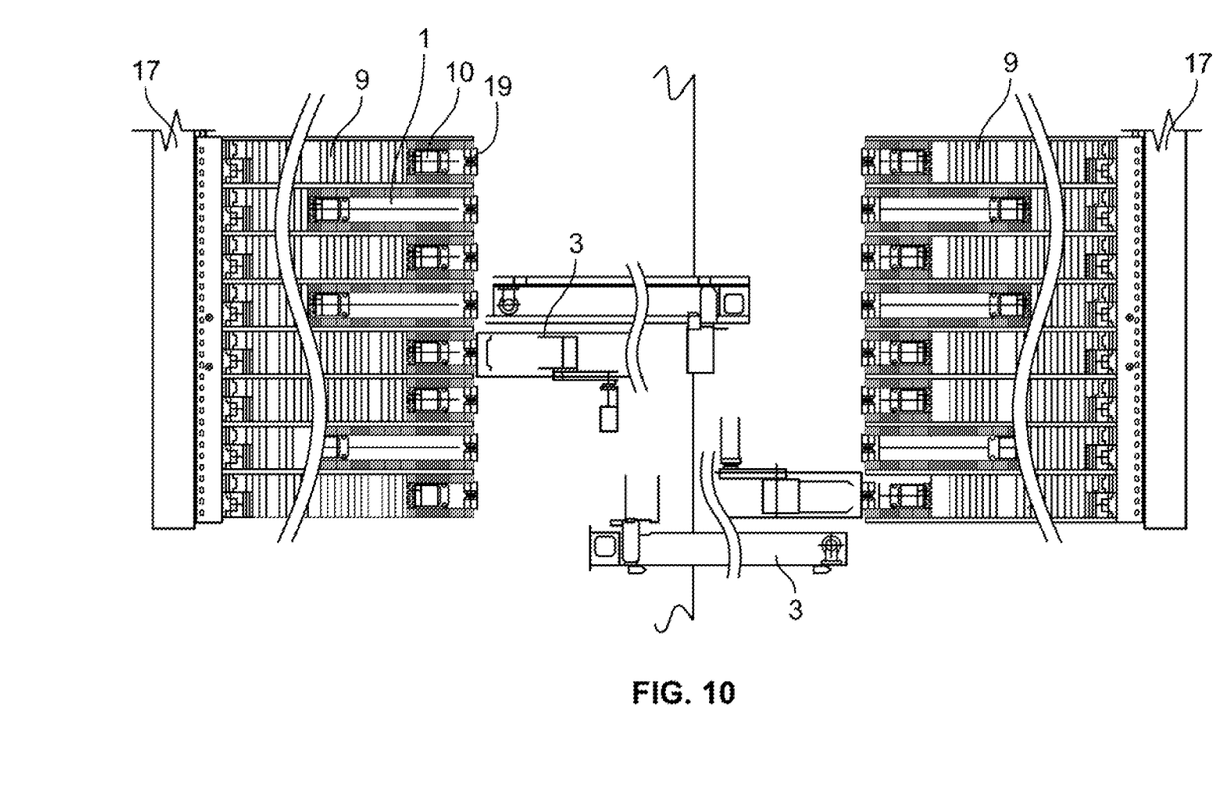
FIG. 10 is a schematic cross-sectional view illustrating the storage devices disposed on the left and right sides and the restocking manipulator disposed in the middle of the storage devices in the automatic storage and distribution device based on an arrangement whereby the largest sides of boxed products are in contact with one another of the present invention.

The number of the storage device 1 may be two, and the discharge ports of the two storage devices 1 are in opposite directions, and the restocking ports are arranged opposing to each other, and the restocking manipulator 3 is disposed in the middle of the two storage devices 1.

A guiding device of the spiral spring driver is disposed on the bottom plate of the storage passages, and the guiding device is parallel to the axis of the storage passages formed by the body of the storage passages. The guiding device is a guiding slot or a guiding rod. The spiral spring energy-storage device further includes an adjusting knob for adjusting the tension of the spiral spring. In use, the adjusting knob is tightened or released to finally control tension of the spiral spring.

Preferably, a guiding rod of the spiral spring driver is disposed on the bottom plate of the storage passages, and the guiding rod has slots arranged at equal intervals in the extending direction. The spiral spring energy-storage device is disposed on the spiral spring driver, and the energy-storage device includes a spiral spring, a shaft lever and a gear. The gear is fixed to the shaft lever, the shaft lever is connected to the inner end of the spiral spring, the shaft lever rotates under the function of the spiral spring torque, and the gear is engaged with the slots in the guiding rod.

Hereinafter, the assembling, restocking, storage and distribution methods are described.

1. The bottom plate of the storage passages is assembled according to the length or width of the dimension of the boxed products (i.e. the longest edge or the second longest edge of the contour dimension) and the height of the discharge control device. The included angle formed between the bottom surface of the bottom plate of the storage passages and the horizontal plane is less than or equal to 9°. The baffle plates having the boxed products anti-reverse brushes are customized to be assembled and inserted on the bottom plate of the storage passages according to the length or width of the dimension of the boxed products (i.e. the longest edge or the second longest edge of the contour dimension). If the bottom plate of the storage passages (the width of the storage passages) is set and assembled according to the width (the second longest edge) of the dimension of the boxed products, the height of baffle plates having the boxed products anti-reverse brushes (the height of the storage passage) is set according to length (longest edge) of the dimension of the boxed products, thus forming N independent storage passages. The brushes are arranged on two sides of the storage passages and extend towards the center of the storage passages.

A matrix unit with N levels and N rows is sequentially formed, and N units are combined into one storage device 1 as required. The discharge control device 8 is installed at the discharge port of each storage passage, and the spiral spring driver 10 is installed in each storage passage, and the spiral spring energy-storage device 11 is installed correspondingly. The products receiving and delivering conveyor belt 17 is disposed below the discharge port, and the restocking manipulator 3 is installed at the restocking position (the rear of the storage device), and thus the assembling is completed.

2. In restocking the products, the computer sends out the instructions, and the manipulator moves from the restocking platform to the restocking port of the storage passages. The manipulator locks up the driver-retracting roller device 19, pulls out the spiral spring driver and fixes the spiral spring driver, and sequentially pushes the boxed products arranged according to the largest sides on the manipulator restocking platform into the storage passages. The spiral spring driver is released, the manipulator returns to the restocking platform, and so forth, and thus the restocking is completed.

3. Since the boxed products are stored according to the largest sides in the storage passages, when discharge, the thrust device of the discharge control device after receiving the discharge instructions urges the outmost products at the discharge port of the storage passage to a height over the highest point of the discharge port barrier, and now, the spiral spring driver is driven by the spiral spring driving device to move towards the discharge port, so that the products under urging are pushed out of the discharge port, and thus the discharge is realized. The products in N storage passages can be discharged at the same time when receiving the discharge instructions at the same time. The products receiving and delivering conveyor belt 17 transports the discharged products to the designated distribution window, and thus the distribution is completed.

The present invention is further described in details with reference to the following embodiments.

EXAMPLE 1

Referring to FIG. 8, an automatic storage and distribution device based on an arrangement whereby the largest sides of boxed products are in contact with one another includes a storage device 1, a blind door 2 and a restocking manipulator 3. The blind door 2 is disposed at the front of the storage device 1, and the restocking manipulator 3 is disposed at the rear of the storage device 1. The storage device includes a plurality of storage units 4. Each storage unit includes a matrix storage rack 5 provided with a plurality of storage passages in matrix arrangement. Each storage passage includes two baffle plates 6 and a bottom plate 7. A discharge control device 8 is disposed at the front of a discharge end of each storage passage fixedly connected with the storage rack. A spiral spring driver 10 is further disposed on each storage passage, boxed products 9 are placed between the spiral spring driver and the discharge controller, and the spiral spring driver is driven by a corresponding spiral spring energy-storage device 11 to move towards the discharge end of the storage passage. The cross-sections of the storage passages are U-shaped or square-shaped. The spiral spring driver 10 when moves tightly urges the product boxes at the front of the spiral spring driver 10 in the direction towards the discharge port, and the discharge operation of the product boxes is accomplished under the control of the discharge control device 8.

The bottom plate and the baffle plates of the storage passages are detachable from each other, a plurality of slots for inserting the baffle plates of the storage passages are arranged in the bottom plate at each level of the matrix storage rack, the slots extend in a direction that is the same as that of the storage passages, and the bottom plate of the storage rack is partitioned by the baffle plates into the plurality of storage passages. The two baffle plates of each storage passage have anti-reverse brushes 18 in the extending direction, and the brushes are disposed at an inner side of the baffle plates 6 and extend towards a central line of the storage passage.

The spiral spring energy-storage device 11 is disposed on the spiral spring driver 10, and the energy-storage device includes a spiral spring and a traction wire winder. The spiral spring is disposed in a cavity of the traction wire and is driven by a torque to propel the spinning of the winder. A traction wire is wound on the winder, and the other end of the traction wire is fixed to the discharge control device 8. Under the function of the force, the spiral spring driver 10 moves towards the discharge end of the storage passage.

The driver-retracting roller device 19 is disposed at the restocking port of each storage passage, and the roller device includes a driver-retracting traction wire winder. A traction wire is wound on the winder, and the other end of the traction wire is fixed to the spiral spring driver 10.

The discharge control device 8 includes a front barrier 12, a thrust device 13 and a second box-anti-lifting device 14. The front barrier 12 is disposed at the far front end of the discharge port of the storage passage, the thrust device 13 is disposed at the bottom of the front end of the storage passage, the thrust device 13 when urges is located at the rear of the front barrier 12 and the second box-anti-lifting device 14 is located above the front end of the storage passages. The discharge end of the storage passage is lower than the other end of storage passages, and an included angle formed between the storage passages and the horizontal plane is 9°. The width of the slats 15 of the blind door is 100 mm, and the slats 15 of the blind door are able to turn over. A buffer curtain is disposed between the blind door 2 and the storage device 1. Since the slats of the blind door have an angle from the horizontal plane, the discharged boxed products under the buffer of the slats of the blind door or the buffer curtain fall on the conveyor belt 17 below, and are delivered to the designated location. The slats of the blind door also have the other functions: when the slats 15 and the horizontal plane are in the same plane, the discharge status can be observed, and when the slats of the blind door 15 are vertical to the horizontal plane, the blind door provides the shade function and renders a chic appearance.

The thrust device 13 in the discharge control device 8 is a rotary hard piece. One end of the rotary hard piece is fixed to the output shaft of a motor in the discharge control device and is able to rotate by 360° when propelled by the motor. A circular plane where the rotary hard piece rotates is parallel to the largest sides of the boxed products that are urged up and is intersected with other sides of the boxed products. A discharged-products counting device 16 is disposed on the left and right positions at the front of the discharge port of the storage passage in each storage unit 4. A discharged-products conveyor belt 17 is arranged at the bottom of the storage device 1.

A spiral spring driver guiding device is disposed on the bottom plate of the storage passages, and the guiding device is parallel to the axis of the storage passages formed by the body of the storage passages. The guiding device is a guiding slot. The energy-storage device further includes an adjusting knob for adjusting the tension of the spiral spring. In use, the adjusting knob is tightened or released to finally control tension of the spiral spring. The material of the spiral spring is steel.

When it needs to restock, the manipulator moves from the restocking platform to the restocking port of the storage passages. The manipulator locks up the driver-retracting roller device 19, pulls out the spiral spring driver and fixes the spiral spring driver, and sequentially pushes the boxed products arranged according to the largest sides on the manipulator restocking platform into the storage passages. The spiral spring driver is released, the manipulator returns to the restocking platform, and so forth, and thus the restocking is completed.

When discharge, the computer sends out the discharge instructions, the thrust device in the discharge control device urges the foremost boxed products at the discharge port to be over the front barrier, and the spiral spring driver moves under the function of the spiral spring, and the details include: the spiral spring disposed on the spiral spring driver winds up the traction wire connected to the discharge control device, i.e. the product boxes move towards the discharge port under the extrusion action of the spiral spring driver, the first box of products is extruded out of the discharge port, and when a continuous discharge is required, the continuous discharge can be achieved by repeating the above-mentioned steps, and thus the storage, restocking and discharge of the stored items are completed.

A storage and distribution method based on above-mentioned storage and distribution device based on an arrangement whereby the largest sides of boxed products are in contact with one another includes the following steps.

In Step 1, the storage and distribution device 1 is assembled. The baffle plates having the boxed products anti-reverse brushes are assembled on the bottom plate of the storage passages of the storage rack 5 of each storage unit 4 according to the length or width of the dimension of the boxed products, i.e. the longest edge or the second longest edge of the contour dimension. If the height between the bottom plates of the storage passages is set and assembled according to the width of the dimension of the boxed products i.e. the second longest edge, the width between the baffle plates having the boxed products anti-reverse brushes is set according to the length of the dimension of the boxed products i.e. the longest edge, thus forming N independent storage passages. If the height between the bottom plates of the storage passages is set and assembled according to the length of the dimension of the boxed products i.e. the longest edge, the width between the baffle plates having the boxed products anti-reverse brushes is set according to the width of the dimension of the boxed products i.e. the second longest edge, thus forming N independent storage passages. The storage unit 4 is assembled and finally the storage device 1 is formed. The above-mentioned "width" and "height" refer to the width and the height between two neighboring baffle plates.

In Step 2, a discharge control device 8 is disposed at the front end of each storage passage of the storage device, a spiral spring driver 10 is disposed on each storage passage, and a spiral spring energy-storage device 11 and a driver-retracting roller device 19 are disposed correspondingly.

In Step 3, a products receiving and delivering conveyor belt 17 is disposed under the discharge port, a blind door 2 is disposed at the front of the discharge port, and a restocking manipulator 3 is disposed at the rear of the storage device, whereby the assembling operation is completed.

In Step 4, the products are restocked. The manipulator moves from the restocking platform to the restocking port of the storage passages, the manipulator locks up the driver-retracting roller device 19 and propels the spinning of the winder, and finally under the traction of the winding wire, the spiral spring driver 10 is pulled out and fixed. Then, the boxed products arranged according to the largest sides on the restocking platform are sequentially pushed by the manipulator into the storage passages, the spiral spring driver 10 is released, the manipulator returns to the restocking platform, and then step 4 is repeated until the restocking of all the storage passages is completed.

In Step 5, it is determined if the discharge instructions exist. If yes, the thrust device of the discharge control device 8 urges the outmost product 9 at the discharge port of the storage passage to a height over the highest point of the discharge port barrier, so that the spiral spring driver 10 is driven by the spiral spring driving device 11 to move towards the discharge port, and the urged product is pushed out of the discharge port, thus achieving the discharge purpose, and now, the counting device 16 counts the discharged product boxes. The discharged product boxes fall on the discharged-products conveyor belt 17 and are delivered out. If no discharge instructions exist, no operations are carried out.

In Step 6, it is determined if the restocking operation needs to be carried out, if yes, the Step 4 is executed, and if no, no operations are carried out.

EXAMPLE 2

An automatic storage and distribution device based on an arrangement whereby the largest sides of boxed products are in contact with one another includes a storage device 1, a blind door 2 and a restocking manipulator 3. The blind door 2 is disposed at the front of the storage device 1, and the restocking manipulator 3 is disposed at the rear of the storage device 1. The storage device includes a plurality of storage units 4. Each storage unit includes a matrix storage rack 5 provided with a plurality of storage passages in matrix arrangement. Each storage passage includes two baffle plates 6 and a bottom plate 7. A discharge control device 8 is disposed at the front of a discharge end of each storage passage fixedly connected with the storage rack. A spiral spring driver 10 is further disposed on each storage passage, boxed products 9 are placed between the spiral spring driver and the discharge controller, and the spiral spring driver is driven by a corresponding spiral spring energy-storage device 11 to move towards the discharge end of the storage passage. The cross-sections of the storage passages are U-shaped. The spiral spring driver 10 when moves tightly urges the product boxes at the front of the spiral spring driver 10 in the direction towards the discharge port, and the discharge operation of the product boxes is accomplished under the control of the discharge control device 8.

The bottom plate and the baffle plates of the storage passages are detachable from each other, a plurality of slots for inserting the baffle plates of the storage passages are arranged in the bottom plate at each level of the matrix storage rack, the slots extend in a direction that is the same as that of the storage passages, and the bottom plate of the storage rack is partitioned by the baffle plates into the plurality of storage passages. The two baffle plates of each storage passage have anti-reverse brushes 18 in the extending direction, and the brushes are disposed on an inner side of the baffle plates 6 and extend towards a central line of the storage passage.

The spiral spring energy-storage device 11 is disposed at the rear of the discharge control device 8 and under the discharge port of the storage passage. The energy-storage device 11 includes a spiral spring and a traction wire winder. The spiral spring is disposed in a cavity of the traction wire and is driven by a torque to propel the spinning of the winder. A traction wire is wound on the winder, and the other end of the traction wire is connected to the spiral spring driver 10. Under the function of the force, spiral spring driver 10 moves towards the discharge end of the storage passage.

The discharge control device 8 includes a front barrier 12, a thrust device 13 and a second box-anti-lifting device 14. The front barrier 12 is disposed under the discharge port of the storage passage, the thrust device 13 is disposed at the bottom of the front end of the storage passages, the thrust device 13 when urges is located at the rear of the front barrier 12 and the second box-anti-lifting device 14 is located above the front end of the storage passages. The discharge end of the storage passage is lower than the other end of storage passages, and an included angle formed between the storage passages and the horizontal plane is 5°. The width of the slats 15 of the blind door is 120 mm, and the slats 15 of the blind door are able to turn over. Since the slats of the blind door have an angle from the horizontal plane, the discharged boxed products under the buffer of the slats of the blind door or the buffer curtain fall on the conveyor belt 17 below, and are delivered to the designated location. The slats of the blind door also have the other functions: when the slats 15 and the horizontal plane are in the same plane, the discharge status can be observed, and when the slats of the blind door 15 are vertical to the horizontal plane, the blind door provides the shade function and renders a chic appearance.

A spiral spring driver guiding device is disposed on the bottom plate of the storage passages, and the guiding device is parallel to the axis of the storage passages formed by the body of the storage passages. The guiding device is a guiding slot. The energy-storage device further includes an adjusting knob for adjusting the tension of the spiral spring. In use, the adjusting knob is tightened or released to finally control tension of the spiral spring. The material of the spiral spring is copper.

When it needs to restock, the manipulator moves from the restocking platform to the restocking port of the storage passages. The manipulator locks up the driver-retracting roller device 19, pulls out the spiral spring driver and fixes the spiral spring driver, and sequentially pushes the boxed products arranged according to the largest sides on the manipulator restocking platform into the storage passages. The spiral spring driver is released, the manipulator returns to the restocking platform, and so forth, and thus the restocking is completed.

When discharge, the computer sends out the discharge instructions, the thrust device in the discharge control device urges the foremost boxed products at the discharge port to be over the front barrier, and the spiral spring driver moves under the function of the spiral spring, and the details include: the spiral spring disposed at the rear of the discharge control device winds up the traction wire connected to the spiral spring driver, i.e. the product boxes move towards the discharge port under the extrusion action of the spiral spring driver, the first box of products is extruded out of the discharge port, and when a continuous discharge is required, the continuous discharge can be achieved by repeating the above-mentioned steps, and thus the storage, restocking and discharge of the stored items are completed.

EXAMPLE 3

An automatic storage and distribution device based on an arrangement whereby the largest sides of boxed products are in contact with one another includes a storage device 1, a blind door 2 and a restocking manipulator 3. The blind door 2 is disposed at the front of the storage device 1, and the restocking manipulator 3 is disposed at the rear of the storage device 1. The storage device includes a plurality of storage units 4. Each storage unit includes a matrix storage rack 5 provided with a plurality of storage passages in matrix arrangement. Each storage passage includes two baffle plates 6 and a bottom plate 7. A discharge control device 8 is disposed at the front of a discharge end of each storage passage fixedly connected with the storage rack. A spiral spring driver 10 is further disposed on each storage passage, boxed products 9 are placed between the spiral spring driver and the discharge controller, and the spiral spring driver is driven by a corresponding spiral spring energy-storage device 11 to move towards the discharge end of the storage passage. The cross-sections of the storage passages are U-shaped. The spiral spring driver 10 when moves tightly urges the product boxes at the front of the spiral spring driver 10 in the direction towards the discharge port, and the discharge operation of the product boxes is accomplished under the control of the discharge control device 8.

The bottom plate and the baffle plates of the storage passages are detachable from each other, a plurality of slots for inserting the baffle plates of the storage passages are arranged in the bottom plate at each level of the matrix storage rack, the slots extend in a direction that is the same as that of the storage passages, and the bottom plate of the storage rack is partitioned by the baffle plates into the plurality of storage passages. The two baffle plates of each storage passage have anti-reverse brushes 18 in the extending direction, and the brushes are disposed on an inner side of the baffle plates 6 and extend towards a central line of the storage passage.

A guiding rod of the spiral spring driver is disposed on the bottom plate of the storage passages, and the guiding rod has slots arranged at equal intervals in the extending direction. The spiral spring energy-storage device is disposed on the spiral spring driver, and the energy-storage device includes a spiral spring, a shaft lever and a gear. The gear is fixed to shaft lever, the shaft lever is connected to the inner end of the spiral spring, the shaft lever rotates under the function of the spiral spring torque, and the gear is engaged with the slots in the guiding rod, thus finally propelling the spiral spring driver to move along the guiding rod towards the discharge end of the storage passage.

The discharge control device 8 includes a front barrier 12, a thrust device 13 and a second box-anti-lifting device 14. The front barrier 12 is disposed under the discharge port of the storage passage, the thrust device 13 is disposed at the bottom of the front end of the storage passages, the thrust device 13 when urges is located at the rear of the front barrier 12 and the second box-anti-lifting device 14 is located above the front end of the storage passages. The thrust device 13 in the discharge control device 8 is a cam. The discharge end of the storage passage is lower than the other end of storage passages, and an included angle formed between the storage passages and the horizontal plane is 0°. The width of the slats 15 of the blind door is 120 mm, and the slats 15 of the blind door are able to turn over. A buffer curtain is disposed between the blind door 2 and the storage device 1. Since the slats of the blind door have an angle from the horizontal plane, the discharged boxed products under the buffer of the slats of the blind door or the buffer curtain fall on the conveyor belt below, and are delivered to the designated location. The slats of the blind door also have the other functions: when the slats 15 and the horizontal plane are in the same plane, the discharge status can be observed, and when the slats of the blind door 15 are vertical to the horizontal plane, the blind door provides the shade function and renders a chic appearance.

The energy-storage device further includes an adjusting knob for adjusting the tension of the spiral spring. In use, the adjusting knob is tightened or released to finally control tension of the spiral spring. The material of the spiral spring is steel.

When it needs to restock, the manipulator moves from the restocking platform to the restocking port of the storage passages. The manipulator locks up the driver-retracting roller device 19, pulls out the spiral spring driver and fixes the spiral spring driver, and sequentially pushes the boxed products arranged according to the largest sides on the manipulator restocking platform into the storage passages. The spiral spring driver is released, the manipulator returns to the restocking platform, and so forth, and thus the restocking is completed.

When discharge, the computer sends out the discharge instructions, the thrust device in the discharge control device urges the foremost boxed products at the discharge port to be over the front barrier, and the spiral spring driver moves under the function of the spiral spring, and the details include: the shaft lever in the energy-storage device rotates under the function of the spiral spring torque and at the same time propels the rotation of the gear fixed to the shaft lever, the gear is engaged with the slots in the guiding rod, thus finally propelling the spiral spring driver to move along the guiding rod towards the discharge end of the storage passage. Now, the product boxes move towards the discharge port under the extrusion action of the spiral spring driver, the first box of products is extruded out of the discharge port, and when a continuous discharge is required, the continuous discharge can be achieved by repeating the above-mentioned steps, and thus the storage, restocking and discharge of the stored items are completed.

EXAMPLE 4

Referring to FIGS. 9 and 10, an automatic storage and distribution device based on an arrangement whereby the largest sides of boxed products are in contact with one another includes left and right storage devices 1, a blind door 2 and a restocking manipulator 3. The blind door 2 is disposed at the front of the storage device 1, and the restocking manipulator 3 is disposed in the middle of the left and right storage devices 1. The storage device includes a plurality of storage units 4. Each storage unit includes a matrix storage rack 5 provided with a plurality of storage passages in matrix arrangement. Each storage passage includes two baffle plates 6 and a bottom plate 7. A discharge control device 8 is disposed at the front of a discharge end of each storage passage fixedly connected with the storage rack. A spiral spring driver 10 is further disposed on each storage passage, boxed products 9 are placed between the spiral spring driver and the discharge controller, and the spiral spring driver is driven by a corresponding spiral spring energy-storage device 11 to move towards the discharge end of the storage passage. The cross-sections of the storage passages are U-shaped or the square-shaped. The spiral spring driver 10 when moves tightly urges the product boxes at the front of the spiral spring driver 10 in the direction towards the discharge port, and the discharge operation of the product boxes is accomplished under the control of the discharge control device 8.

The bottom plate and the baffle plates of the storage passages are detachable from each other, a plurality of slots for inserting the baffle plates of the storage passages are arranged in the bottom plate at each level of the matrix storage rack, the slots extend in a direction that is the same as that of the storage passages, and the bottom plate of the storage rack is partitioned by the baffle plates into the plurality of storage passages. The two baffle plates of each storage passage have anti-reverse brushes 18 in the extending direction, and the brushes are disposed on an inner side of the baffle plates 6 and extend towards a central line of the storage passage.

The spiral spring energy-storage device 11 is disposed on the spiral spring driver 9, and the energy-storage device includes a spiral spring and a traction wire winder. The spiral spring is disposed in a cavity of the traction wire and is driven by a torque to propel the spinning of the winder. A traction wire is wound on the winder, and the other end of the traction wire is fixed to the discharge control device 8. Under the function of the force, the spiral spring driver 9 moves towards the discharge end of the storage passage.

A driver-retracting roller device 19 is disposed at the restocking port of each storage passage, the roller device includes a driver-retracting traction wire winder. A traction wire is wound on the winder, and the other end of the traction wire is fixed to the spiral spring driver 10.

The discharge control device 8 includes a front barrier 12, a thrust device 13 and a second box-anti-lifting device 14. The front barrier 12 is disposed at the far front end of the discharge port of the storage passage, the thrust device 13 is disposed at the bottom of the front end of the storage passages, the thrust device 13 when urges is located at the rear of the front barrier 12, and the second box-anti-lifting device 14 is located above the front end of the storage passages. The discharge end of the storage passage is lower than the other end of storage passages, and an included angle formed between the storage passages and the horizontal plane is 9°. The width of the slats 15 of the blind door is 100 mm, and the slats 15 of the blind door are able to turn over. A buffer curtain is disposed between the blind door 2 and the storage device 1. Since the slats of the blind door have an angle from the horizontal plane, the discharged boxed products under the buffer of the slats of the blind door or the buffer curtain fall on the conveyor belt 17 below, and are delivered to the designated location. The slats of the blind door also have the other functions: when the slats 15 and the horizontal plane are in the same plane, the discharge status can be observed, and when the slats of the blind door 15 are vertical to the horizontal plane, the blind door provides the shade function and renders a chic appearance.

The thrust device 13 in the discharge control device 8 is a rotary hard piece. One end of the rotary hard piece is fixed to the output shaft of a motor in the discharge control device and is able to rotate by 360° when propelled by the motor. A circular plane where the rotary hard piece rotates is parallel to the largest sides of the boxed products that are urged up and is intersected with other sides of boxed products. A discharged-products counting device 16 is disposed on the left and right positions at the front of the discharge port of the storage passage in each storage unit 4. A discharged-products conveyor belt 17 is arranged at the bottom of the storage device 1.

A spiral spring driver guiding device is disposed on the bottom plate of the storage passages, and the guiding device is parallel to the axis of the storage passages formed by the body of the storage passages. The guiding device is a guiding slot. The energy-storage device further includes an adjusting knob for adjusting the tension of the spiral spring. In use, the adjusting knob is tightened or released to finally control tension of the spiral spring. The material of the spiral spring is steel.

The restocking manipulator has left and right restocking devices. When need to restock on the left, the manipulator moves from the restocking platform to the restocking port of the storage passages, the manipulator locks up the driver-retracting roller device 19 on the left, pulls out the spiral spring driver and fixes the spiral spring driver, and sequentially pushes the boxed products arranged according to the largest sides on the manipulator restocking platform into the storage passages. The spiral spring driver is released, and the manipulator returns to restocking platform. When need to restock on the right, the manipulator moves from the restocking platform to the restocking port of the storage passages. The manipulator locks up the driver-retracting roller device 19 on the right, pulls out the spiral spring driver and fixes the spiral spring driver, and sequentially pushes the boxed products arranged according to the largest sides on the manipulator restocking platform into the storage passages. The spiral spring driver is released, the manipulator returns to the restocking platform, and so forth, and thus the restocking on the left and right is completed.

The left and right storage units 4 have a conveyor belt 17 respectively. When the left storage unit needs to discharge, the computer sends out the discharge instructions, the thrust device in the discharge control device of the left storage unit urges the foremost boxed products at the discharge port to be over the front barrier, and the spiral spring driver moves under the function of the spiral spring, and the details include: the spiral spring disposed on the spiral spring driver winds up the traction wire connected to the discharge control device, i.e. the product boxes move towards the discharge port under the extrusion action of the spiral spring driver, the first box of products is extruded out of the discharge port, and the conveyor belt 17 of the left storage unit delivers the products to the designated position. When the right storage unit needs to discharge, the computer sends out the discharge instructions, the thrust device in the discharge control device of the right storage unit urges the foremost boxed products at the discharge port to be over the front barrier, and the spiral spring driver moves under the function of the spiral spring, and the details include: the spiral spring disposed on the spiral spring driver winds up the traction wire connected to the discharge control device, i.e. the product boxes move towards the discharge port under the extrusion action of the spiral spring driver, the first box of products is extruded out of the discharge port, and the conveyor belt 17 of the right storage unit delivers the products to the designated position. When a continuous discharge is required, the continuous discharge can be achieved by repeating the above-mentioned steps, and thus the storage, restocking and discharge of the stored items are completed.

The invention claimed is:

1. A storage and distribution device, comprising:
(i) a blind door, (ii) a restocking manipulator, and (iii) a plurality of storage units,
wherein the blind door is disposed at the front of the storage and distribution device,
wherein the restocking manipulator is disposed at the rear of the storage and distribution device,
each of the storage units comprising a matrix storage rack provided with a plurality of storage passages in a matrix arrangement, wherein inclination of each of the storage passages with respect to a horizontal plane is less than or equal to 9°,
each of the storage passages comprising two baffle plates having anti-reverse brushes and a bottom plate,
wherein a discharge control device fixedly connected to the matrix storage rack is disposed at a discharge end of each storage passage and the discharge control device comprises a thrust device having an arcuate shape for providing a rotary lift to one or more boxed products, the thrust device directly fixed to an output shaft of a motor such that the thrust device rotates to an angle adjustable between 0° and 360° in a circular plane when propelled by the motor,
wherein a spiral spring driver is further disposed on each storage passage,
wherein the spiral spring driver is positioned for the one or more boxed products to be placed between the spiral spring driver and the discharge control device,
wherein the spiral spring driver is driven by a corresponding spiral spring energy-storage device to move towards the discharge end of the storage passage, and the restocking manipulator restocks and checks stocks of the storage device.

2. The storage and distribution device of claim 1, wherein the bottom plate and the baffle plates of the storage passages are detachable from each other, a plurality of slots for inserting the baffle plates of the storage passages are arranged in the bottom plate at each level of the matrix storage rack, the slots extend in a direction that is the same as that of the storage passages, and the bottom plate of the storage rack is partitioned by the baffle plates into the plurality of storage passages.

3. The storage and distribution device of claim 1, wherein the two baffle plates have anti-reverse brushes in the extending direction, and the brushes are disposed on an inner side of the baffle plates of the storage passage and extend towards a central axis of the storage passage.

4. The storage and distribution device of claim 1, wherein the spiral spring energy-storage device is disposed on the spiral spring driver, the energy-storage device comprises a spiral spring and a traction wire winder, the spiral spring is disposed in a cavity of the traction wire winder and is driven by a torque to propel the spinning of the winder, a traction wire is wound on the winder, and the other end of the traction wire is fixed to the discharge control device.

5. The storage and distribution device of claim 1, wherein the spiral spring energy-storage device is disposed at the rear of the discharge control device and under a discharge port of the storage passage, the energy-storage device comprises a spiral spring and a traction wire winder, the spiral spring is disposed in a cavity of the traction wire and is driven by a torque to propel the spinning of the winder, a traction wire is wound on the winder, and the other end of the traction wire is connected to the spiral spring driver.

6. The storage and distribution device of claim 1, wherein a driver-retracting roller device is disposed at a restocking port of each storage passage, the roller device comprises a driver-retracting traction wire winder, a traction wire is wound on the winder, and the other end of the traction wire is fixed to the spiral spring driver.

7. The storage and distribution device of claim 1, wherein the discharge control device further comprises a front barrier, and a second box-anti-lifting device, the front harrier is disposed at a discharge port of the storage passage, wherein the thrust device of the discharge control device is disposed at the bottom of the front end of the storage passage, the thrust device when urged is located behind the front barrier, and the second box-anti-lifting device is located above the storage passage.

8. The storage and distribution device of claim 7, wherein the thrust device in the discharge control device is a rotary hard piece, the circular plane where the rotary hard piece rotates is parallel to largest sides of the one or more boxed products that are urged up, and the rotary hard piece is in contact with the bottom of the one or more boxed products.

9. Two of the storage and distribution devices of claim 1, wherein the discharge ports of the two storage and distribution devices are in opposite directions, the restocking ports are arranged opposing to each other, and the restocking manipulator is disposed in the middle of the two storage devices.

10. The storage and distribution device of claim 1, wherein slats of the blind door have a width larger than or equal to 100 mm, and the slats of the blind door are able to turn over.

11. The storage and distribution device of claim 1, wherein a buffer curtain is disposed between the blind door and the storage device.

12. The storage and distribution device of claim 1, wherein a discharged-products counting device is disposed on the left and right positions at the front of the discharge port of the storage passage in each storage unit.

13. The storage and distribution device of claim 1, wherein a discharged-products conveyor belt is arranged at the bottom of the storage device.

* * * * *